Figure 1:
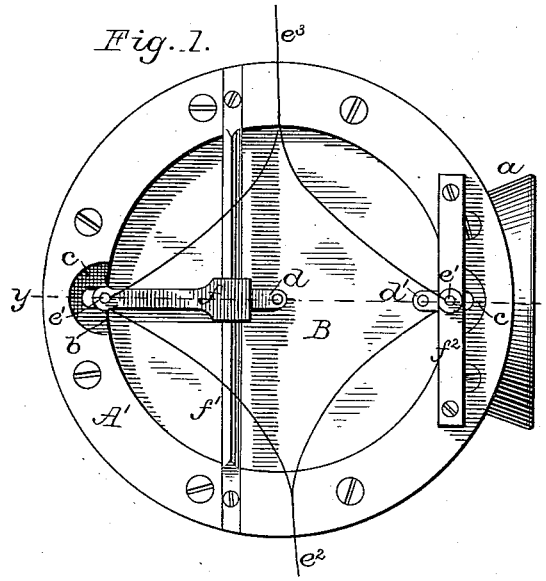

(No Model.) 2 Sheets—Sheet 1.

R. EICKEMEYER.
ELECTRIC TRANSMITTING TELEPHONE.

No. 464,152. Patented Dec. 1, 1891.

Attest:
Philip F. Larner
Howell Bartte

Inventor:
Rudolf Eickemeyer
By Wm C Mud
Attorney

THE NORRIS PETERS CO., PHOTO-LITHO., WASHINGTON, D. C.

(No Model.) 2 Sheets—Sheet 2.
R. EICKEMEYER.
ELECTRIC TRANSMITTING TELEPHONE.
No. 464,152. Patented Dec. 1, 1891.
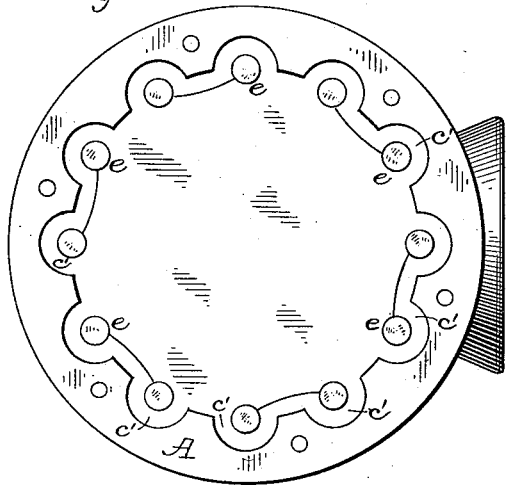
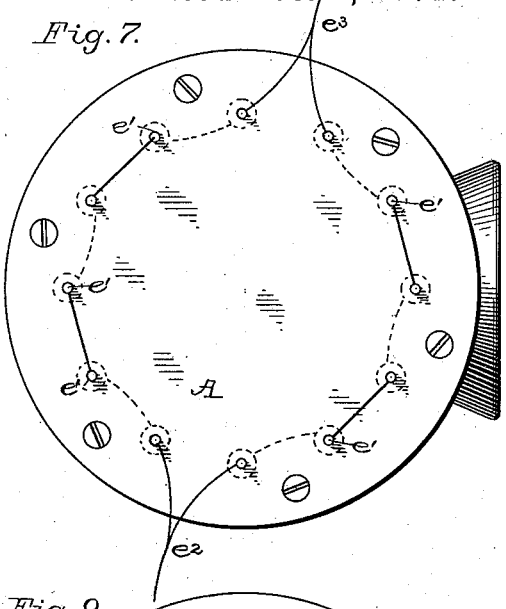
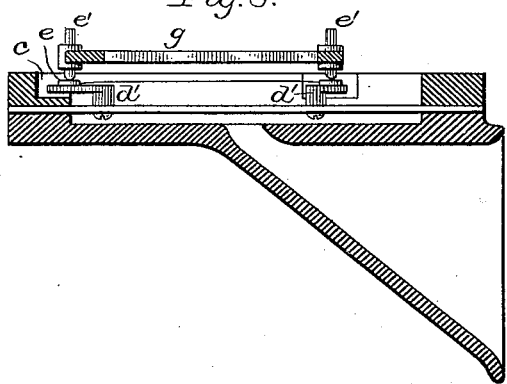
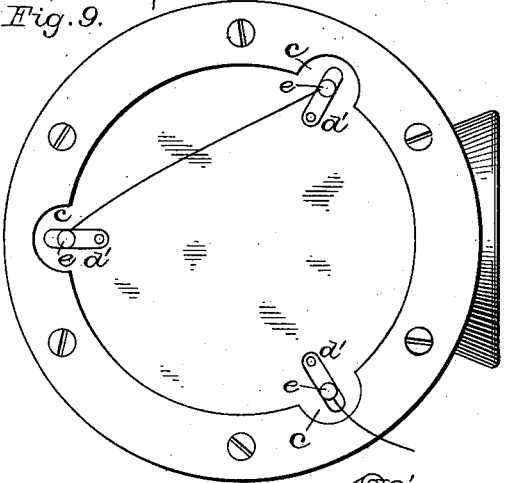
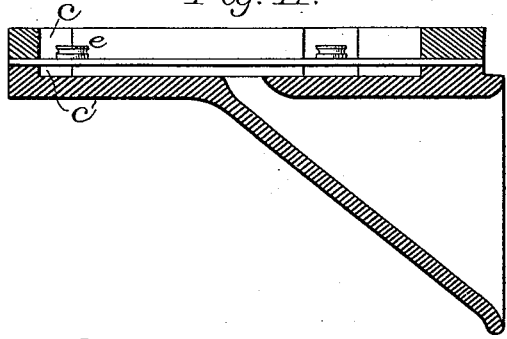
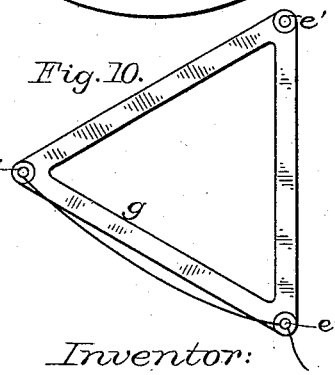
Attest:
Philip F. Larner.
Howell Battle.
Inventor:
Rudolf Eickemeyer
By Wm C Wood
Attorney.

UNITED STATES PATENT OFFICE.

RUDOLF EICKEMEYER, OF YONKERS, NEW YORK.

ELECTRIC TRANSMITTING-TELEPHONE.

SPECIFICATION forming part of Letters Patent No. 464,152, dated December 1, 1891.

Application filed May 23, 1883. Serial No. 95,957. (No model.)

*To all whom it may concern:*

Be it known that I, RUDOLF EICKEMEYER, of Yonkers, in the county of Westchester and State of New York, have invented certain new and useful Improvements in Electric Transmitting-Telephones; and I do hereby declare that the following specification, taken in connection with the drawings furnished and forming a part of the same, is a clear, true, and complete description of my invention.

The object of my improvements is to so equalize the vibrations of a transmitting-diaphragm that all the vibrations induced are imparted to the electric contact-points in their relative proportions in order that the transmitter will serve equally well whether words be spoken as in ordinary conversation or loudly shouted and so that the greatest vibrations of the diaphragm possibly resulting from the human voice will be incapable of breaking connection at the contact-points. Similar ends have heretofore been sought in various ways, either by employing springs or other dampening devices in contact with the free or central portion of the diaphragm or by having the contact-points or electrodes located approximately near or at the center of the diaphragm and backing them up by weights or springs. In another class of electric transmitting-telephones both contact-points have been attached to the diaphragm and the vibrations between them regulated by the inertia of one of said contacts. So far as I know I am the first to provide a clamped diaphragm composed of suitable material with electric contacts which in no manner impair the natural vibrating capacity of the diaphragm. Instead of applying my contacts or electrodes within what has heretofore been deemed the field of vibration, or, in other words, at points approximating more or less closely to the center of the clamped diaphragm, I apply my electrodes or contacts upon or closely adjacent to the face of the diaphragm and in a plane parallel with said face and also adjacent to what I will term for the purposes of this specification the "clamp-line" of the diaphragm, meaning thereby that line around the diaphragm at which the biting-edges of the clamping devices are located. So far as I can now determine from my experiments the varied vibrations of a clamped diaphragm are so nearly equalized at the electrode that the variations in the electric currents through the contacts located as described are provided for with as much nicety and accuracy as is practically attainable, inasmuch as I find that in proportion as said electric contacts are located nearer the center of the diaphragm so is the transmitting capacity of the instrument impaired.

Although I illustrate in my drawings and hereinafter particularly describe diaphragms of circular form, it is to be understood that so far as relates to my present improvements the form of the diaphragms may be indefinitely varied, and as to the electric contacts it is also to be understood that they may be composed of hard carbon or in each pair one may be carbon and the other platinum, or both may be of platinum, or other well-known suitable conducting materials may be employed.

My novel transmitter involves in its operation what I deem to be a novel method of equalizing such variable vibrations of a clamped diaphragm as are incident to or are induced by oral sounds and transmitting said equalized vibrations electrically.

To more particularly describe my invention, I will refer to the accompanying drawings, in which—

Figure 2:
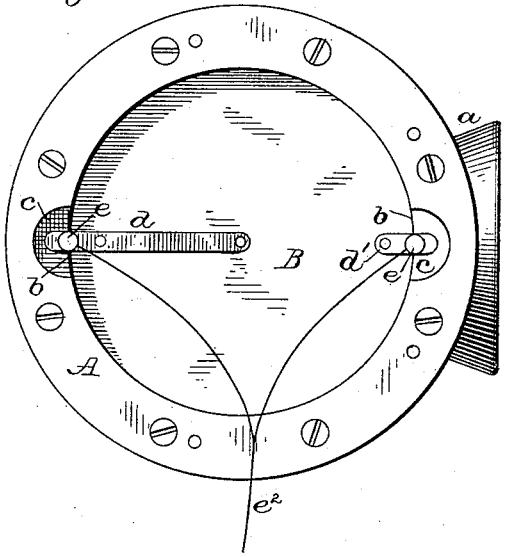
Figure 3:
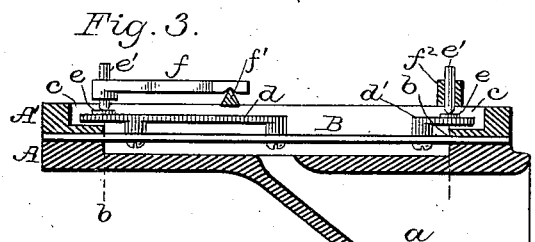
Figure 4:
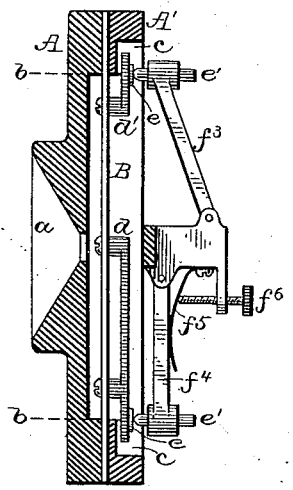
Figure 5:
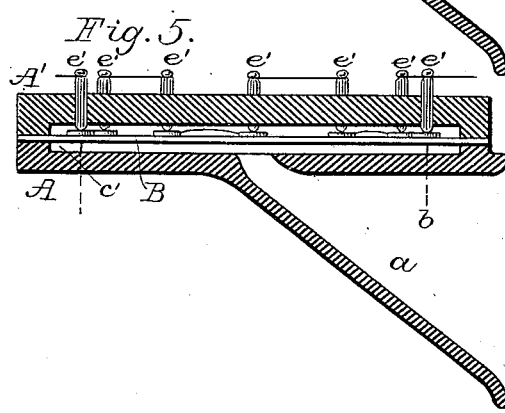

Figure 1 is a top view of one of my transmitters, having two pairs of electric contacts or electrodes. Fig. 2 is a top view of the same with the upper contacts removed. Fig. 3 is a vertical central section of the same on line $y$, Fig. 1. Fig. 4 is a vertical central section of a differently-constructed transmitter embodying my invention. Fig. 5 is a central vertical section of another form of transmitter embodying the main feature of my invention. Fig. 6 is a top view of the diaphragm of the transmitter Fig. 5 with the upper contacts removed. Fig. 7 is a top view of the transmitter Fig. 5. Fig. 8 is a vertical central section of still another form of transmitter embodying my invention. Fig. 9 is a top view of the diaphragm of the same with upper contacts removed. Fig. 10 is a top view of a frame in which the upper contacts are mounted. Fig. 11 illustrates a modification of the arrangement of lower contacts for a transmitter otherwise like Fig. 8.

The casings of all of the transmitters shown are constructed so as to afford a clamp-bed A and a clamp-cap A', which by means of suitable screws firmly clamp the diaphragm B at or near its periphery. The mouth-piece $a$, as usual, terminates internally opposite the center of the diaphragm, which is composed of any suitable material, such as iron, wood, or mica.

Referring to Figs. 1, 2, and 3, it will be seen that the diaphragm B is annularly clamped, the inner edge of the clamp constituting what I have termed the "clamp-line" of the diaphragm, as indicated at $b$, and it is to be understood that for the best results the electric contacts or electrodes are located as nearly coincident with said clamp-line as possible.

In Figs. 1 to 3, inclusive, the clamp-cap A' at its lower edge or clamp-line $b$ is unbroken, and in order that the contacts may nevertheless be located substantially adjacent to said clamp-line one or more recesses are formed—as, for instance, the cap A' at two oppositely-located points is recessed, as at $c$, from its top downward on its inner side to within a short distance from the under side of the cap. Two brackets or arms $d$ and $d'$ are firmly secured to the upper side or face of the diaphragm, and each bracket projects radially into its adjacent recess $c$. The bracket $d$ extends from the center of the diaphragm radially and has two screws or rivets for firmly connecting it therewith; but the bracket $d'$ is secured to the diaphragm near but wholly inside of the clamp-line. Upon these two brackets the lower contacts or electrodes $e$ are mounted, whether of carbon, platinum, or other suitable material, and if the diaphragm be of iron or other conducting metal said contacts should be properly insulated therefrom. With the brackets thus extended across the clamp-line it is obvious that the upper contacts $e'$ may be supported on the lower or bracket contacts $e$ above, but substantially coincident with said clamp-line. One upper contact $e'$ is firmly mounted in the free end of an arm $f$, which at its opposite end is pivoted upon a knife-edged bar $f'$, secured across the upper surface of the clamp-cap. The other contact $e'$ is loosely mounted in a socket in a bar $f^2$, so that it can freely bear with its own weight upon its lower contact $e$. The lower contacts $e$ are connected with each other and with a conductor $e^2$, serving as a line-wire or ground, and the upper contacts are similarly connected with another conductor $e^3$, serving as a ground or line wire, as the case may be, or the two wires may constitute a metallic circuit.

It will be seen that in this transmitter the pulsations or variations in the electric current passing by way of each pair of contacts are controlled only by such vibrations of the diaphragm as are communicated to the electrodes, and that these are located adjacent to the clamp-line, and that the brackets for the lower contacts, so far as their vibrations are concerned, are in substance portions of the diaphragm itself, and they are here used to enable the location of the contacts in proper position regardless of the presence of the underlying portions of the clamp-cap at the bottom of the recesses $c$, and said brackets are of special value in that they enable me to have a practically unbroken clamp-line, which, as a rule, I deem advisable.

The transmitter described is arranged to operate only in a horizontal position; but in Fig. 4 one is shown which operates in a vertical position—as, for instance, against a wall. In this case one upper or outer contact $e'$ is mounted in the free end of an inwardly-inclined lever $f^3$, pivoted at its opposite or lower end to a central post, so that by reason of said inward inclination the two contacts are properly engaged, and, if need be, said lever may be backed by a spring. The other upper or outer contact $e'$ is mounted in a vertical lever $f^4$, similarly pivoted and backed by a spring $f^5$, which may be graduated as to force by the adjusting-screw $f^6$. The recesses $c$, brackets $d$ and $d'$, and the lower or inner contacts $e$ are as before described. Good results may be obtained if the clamp-line be non-continuous or broken above and below the diaphragm at the points where the contacts are located.

In Figs. 5 to 7 I illustrate a clamp-cap which covers or incloses the diaphragm entirely and is vertically perforated or bored at regular intervals and in a circular line for the free reception of the upper contacts $e'$. The clamp bed and cap are, however, coincidently recessed at intervals, as at $c'$, and the lower contacts $e$ are located on the diaphragm in said recesses, but always substantially in line with the clamp-line $b$. As here shown, twelve pairs of contacts are employed, and they may be variously coupled electrically, according to requirements of service in each case. As shown, the upper contacts $e'$ are electrically connected in pairs alternately, and the lower contacts are similarly connected, so that a + branched conductor $e^2$, connected with two of the upper contacts $e'$ on one side of the instrument, communicates with a − conductor $e^3$ on the opposite side, the current through each branch passing from the first upper contacts to their corresponding lower contacts, and from there to the next adjacent lower contacts, thence to the upper contacts resting thereon, and so on through the instrument, as clearly indicated in Figs. 6 and 7. Instead of being thus coupled in circuit, each upper contact and its lower contact may be separately coupled, respectively, to the two conducting-wires by a separate branch conductor, the result in either case being that all of the electrodes will be electrically connected in linear circuit, although I deem it generally preferable that the several pairs of electrodes be electrically connected in linear series—as, for instance, as illustrated in Fig. 10—it being obvious that the same mode of continuous connection may be employed with the circular arrangement of electrodes illustrated in Figs. 6 and 7 instead of the branched arrangement therein shown.

In Figs. 8 to 10, inclusive, I show one of my transmitters having three pairs of contacts, all located above the clamp-line of the diaphragm, as before described. In this transmitter the brackets $d'$ and lower contacts $e$ are as before described in connection with Fig. 1, and the same is true of the recesses $c$; but of these latter there are three, preferably equidistant from each other. The upper contacts $e'$ are fixedly mounted vertically in the corners of the triangular frame $g$, so that all of said upper contacts bear with uniformity upon the lower contacts. The frame $g$ may be made of any desired weight, or it may be backed up by a spring or weights in an obvious manner, if need be.

In Fig. 11 the lower contact-points $e$ are mounted directly upon the diaphragm and the brackets are dispensed with, the clamping-bed being recessed at $c'$ below the diaphragm, as before described in connection with Figs. 5 to 7, inclusive, while the clamp-cap is recessed, as at $c$, down to the upper surface of the diaphragm, and with this transmitter the previously-described frame $g$ and upper contacts are used. As here shown, one of the outside conducting-wires connects with one of the upper contacts $e$ and the other outside wire connects with a lower contact. Two of the lower contacts are connected, and so also are two of the upper ones, so that an entering current passes down one upper contact $e'$ to its lower contact $e$, thence to the adjacent lower contact $e$, thence to its upper contact $e'$, thence above the frame to the adjacent upper contact $e'$, thence to its lower contact $e$, and thence out of the apparatus; but it is obvious that either pair of contacts may, if desired, be separately coupled to the outside or connecting conductors.

As hereinbefore indicated, the form of the diaphragms may be varied without departure from my invention, and it is to be understood that induction-coils, batteries, or other generators of electricity are to be used with my transmitters, as with other electric telephones.

Although in each of the forms of telephone illustrated more than one pair of electrodes are shown, it is to be distinctly understood that my invention is not restricted to any particular number of pairs of electrodes, it being obvious that the advantages of the main feature of my invention will accrue when a single pair is employed.

While it is deemed desirable that the entire periphery or edge of the diaphragm be clamped, it would be within my invention if the diaphragm be clamped only on each side of each contact-point so long as the contacts can be nevertheless located on the clamp-line—as, for instance, in the transmitter shown in Fig. 8 the diaphragm might not be clamped at all at three points, each midway of the lower contacts, and still the transmitter would operate fairly well.

Notwithstanding the slight variation in location of the electrodes and the variation in the exact location of the clamp-line, it is obvious that in all of the forms of telephone illustrated the location of the electrodes, as well as of the clamp-line, is substantially at the periphery of the diaphragm.

In the transmitter described it will be seen that each diaphragm within the clamp-line $b$ is practically free centrally, and that springs or weights applied to the upper contacts in no manner obstruct the vibrating capacity of the diaphragm, and that in all cases only those vibrations which occur at the electrodes adjacent to the clamp-line are utilized for controlling the electric contacts. It will also be seen that in each form of transmitter illustrated the inner or lower contacts are located upon or closely adjacent to the face of the diaphragm, and that all of them occupy a plane parallel with the plane of said face as distinguished from electric contacts mounted on springs projecting at right angles from the center of the face of the diaphragm or mounted upon springs projecting at right angles from said face for co-operating with contacts mounted upon other springs similarly projected from adjacent portions of the frame of the telephone—as, for instance, as illustrated in German patent to Pensky, No. 7,044 of A. D. 1878, Class 21. In the said prior telephone the amplification of sound-vibrations was sought and obtained by Pensky, and as he employed a dampening-spring in addition to said contact-springs the natural vibrating capacity of the diaphragm was necessarily impaired or restricted, and although his electric contacts were remote from the center of his diaphragm they were not closely adjacent to the clamp-line of the diaphragm nor mounted upon or adjacent to the face thereof nor in a plane substantially parallel thereto, as in my telephone, wherein no amplification of the sound-vibrations of the diaphragm can possibly be involved, inasmuch as I have studiously sought to avoid that feature in order to accomplish the results desired by me.

Having thus described my invention, I claim as new, and desire to secure by Letters Patent—

1. The combination, substantially as hereinbefore described, with a diaphragm and a clamp for confining said diaphragm substantially at its periphery, of the electric contacts or electrodes essentially located remotely from the center of the diaphragm upon or closely adjacent to the face thereof and substantially in line with the inner edge of the clamp.

2. The combination, with a diaphragm, of one or more brackets or arms rigidly secured to said diaphragm near and extending radially toward its periphery, an electric contact or electrode at each bracket, and co-operating electric contacts resting upon the bracket-contacts and in a plane parallel with the face thereof, substantially as described.

3. The combination, substantially as hereinbefore described, of a clamped diaphragm, two or more diaphragm contacts or electrodes located substantially at the clamped edge of said diaphragm and in a plane parallel with the face thereof, a corresponding number of electrodes in loose contact with those which are connected with the diaphragm, and electric conductors by which the several electrodes are connected in linear circuit.

RUDOLF EICKEMEYER.

Witnesses:
HENRY OSTERHELD,
GEORGE NARR.